US006928538B2

(12) United States Patent
French et al.

(10) Patent No.: US 6,928,538 B2
(45) Date of Patent: Aug. 9, 2005

(54) METHOD AND SYSTEM FOR DELAYED BOOTING OF A TARGET DEVICE IN A NETWORK ENVIRONMENT

(75) Inventors: Steven M. French, Austin, TX (US); Chakkalamattam J. Paul, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/844,395

(22) Filed: Apr. 27, 2001

(65) Prior Publication Data

US 2002/0161870 A1 Oct. 31, 2002

(51) Int. Cl.⁷ .......................................... G06F 15/177
(52) U.S. Cl. ........................ 713/1; 713/2; 713/100; 370/252
(58) Field of Search .......................... 713/1, 2, 100; 370/252

(56) References Cited

U.S. PATENT DOCUMENTS

| 4,982,430 | A | * | 1/1991 | Frezza et al. ............... 380/211 |
| 6,170,008 | B1 | * | 1/2001 | Bahlmann et al. .......... 709/220 |
| 6,317,826 | B1 | * | 11/2001 | McCall et al. ................. 713/1 |
| 6,430,687 | B1 | * | 8/2002 | Aguilar et al. ................. 713/2 |
| 6,463,530 | B1 | * | 10/2002 | Sposato ........................ 713/2 |
| 6,553,491 | B1 | * | 4/2003 | Dover ........................ 713/100 |
| 6,684,327 | B1 | * | 1/2004 | Anand et al. .................. 713/2 |
| 6,724,732 | B1 | * | 4/2004 | Abrams et al. ............. 370/252 |
| 6,748,525 | B1 | * | 6/2004 | Hubacher et al. .............. 713/1 |

* cited by examiner

Primary Examiner—A. Elamin
(74) Attorney, Agent, or Firm—Cardinal Law Group; Jeffrey S. LaBaw

(57) ABSTRACT

A method of booting at least one target device in communication with a network, comprising is provided. A bootstrap program is requested from a loading device in communication with the target device. A boot delay response is received from the loading device at the target device, so that the target device does not time out. The bootstrap program is received at the target device after the boot delay response is received.

30 Claims, 6 Drawing Sheets

METHOD AND SYSTEM FOR DELAYED BOOTING OF A TARGET DEVICE IN A NETWORK ENVIRONMENT

BACKGROUND OF THE INVENTION

1. Field of the Invention

The present invention relates to client computers that are bootable over a network and, in particular, client computers that may attempt to boot in competition with other client computers. More specifically, the present invention relates to a method for booting a target device in the presence of network delays in a network environment.

2. Description of the Related Art

Some current computing devices include support for pre-boot extensions to download an operating system (OS) from a network to which they are attached. Such target computing devices include computer motherboards, network adapters and boot diskettes.

These devices may rely on extensions to the bootstrap protocol (BOOTP) and to the dynamic host configuration protocol (DHCP). Such extensions are often termed the preboot execution environment (PXE) and require a DHCP/PXE server and a boot image negotiation layer (BINL) server. Alternatively, these devices may use a feature such as the Remote Program Load (RPL) feature to gain access to the network and request an operating system and other applications. The RPL feature enables the target device to request a bootstrap from another device with a disk drive (the loading device) within the network. The RPL feature also allows the loading device to send the bootstrap to the target device. This loading device may be, for example, a server or another suitable loading device.

With the use of a PXE system or the RPL feature, occasionally a number of target machines may attempt to boot from the network (e.g., from a server or from a loading device) at the same time. In some instances, one or more target machines do not receive the requested bootstrap before ROM on the target machines causes a time out. Such target machines then require a manual reset to cause the boot sequence to re-start on the target machine.

BOOTP is a transmission control protocol/Internet protocol (TCP/IP) used by a diskless workstation, network computer (NC) or other target device to obtain its IP address and other network information, such as server address and default gateway. Upon startup, the target device sends out a BOOTP request to the BOOTP server, which returns the required information. The BOOTP request and response use an IP broadcast function, which is able to send messages before a specific IP address for a target device is known.

DHCP is software that automatically assigns an IP address to a target device logging onto a TCP/IP network. DHCP eliminates the need for manually assigning permanent IP addresses.

PXE enables a client network computer or other target device that lacks a native operating system to locate and acquire a small network bootstrap program (NBP) from a BINL server. The target device may acquire this NBP from a BINL server through a network attachment. PXE also provides a means for running the NPB on the target device. This allows the target device to continue acquiring additional software from the network that may be required to make the target device capable of performing the more complex and useful tasks assigned to it by an enterprise.

PXE relies on extensions of DHCP as the means by which the target device locates a BINL server from which to acquire an NPB. A facilitating property of DHCP is that the target device does not need the address of any other computer. The target device performs a DHCP broadcast to discover any PXE proxy server that can recognize that the target device is PXE-capable. The DHCP proxy server sends a DHCP offer to the target device. The offer contains the address of the BINL server from which the target device may obtain a NBP. The target device then obtains the NBP and all necessary software from the boot server via a trivial file transfer protocol (TFTP).

RPL enables a client network computer or other target device that lacks a native operating system to locate and acquire a bootstrap program (NBP) from a loading device. The target device may acquire this NBP from the loading device through a network attachment. RPL also provides a means for running the NPB on the target device. This allows the target device to continue acquiring additional software from the loading device that may be required to make the target device capable of performing the more complex and useful tasks assigned to it by an enterprise.

RPL generally relies on two programs. These programs are a bootstrap program and a loader program. The bootstrap program is sent by the loading device to one or more target devices. After being installed in the target device, the bootstrap program initializes and restarts the target device. The bootstrap program may be a complete operating system, a program that requests files, a program that requests other programs or any suitable combination of the above.

The loader program sends the bootstrap program to the target device in response to a load request from the target device. The target device may have a RPLBOOT.COM program, which marks the fixed disk in the target device as non-bootable so that the RPL feature can take control when the target device is started.

Whether the target machine relies on PXE and a PXE server or RPL and an RPL loading device to receive its bootstrap, occasionally, the network traffic may be so heavy that the target machine's boot request is ignored and the target machine times out. This may occur, for example, due to heavy network or server load in a boot-storm environment, such as after a power failure and restore, when a number of target devices attempt to boot at the same time.

Alternatively, a target machine's boot request may be acknowledged but due to time outs of network file in and file out requests that occur as the boot sequence is being implemented, the target machine still times out.

Target machines that time out in this manner require a manual reset. This may be problematic in a server-managed environment because the timed-out target device may no longer be controlled from the server or any other device on the network. Rather, an actual person must manually reset the target device. Thus, current approaches to booting a target device in the presence of network delays require a manual reset.

It would be desirable therefore to provide a method of booting a target device in a network environment that overcomes the above.

SUMMARY OF THE INVENTION

One aspect of the present invention provides a method of booting at least one target device in communication with a network. At least one boot file is requested from a loading device in communication with the target device. A boot delay response is executed at the target device so that the target device does not time out. The boot file received at the target device after the boot delay response is received. The boot file may be, for example, a bootstrap program, a configuration file, a boot parameters file, and an operating system file.

Whether a boot delay response should be used may be evaluated based on a state of network congestion. The boot delay response may be executed repeatedly. The loading device may be a server or a client device with a loading program in communication with the target device. The at least one target device may be a plurality of target devices. The boot delay response may be delaying at least one request for the boot file, may be delaying at least one response from the loading device as the boot delay response and/or may be the rebooting of the target device after a timeout value has expired. Boot parameters on the target device and/or on the loading device may be modified based on the boot delay response.

Another aspect of the present invention provides computer program product in a computer usable medium for providing at least one boot file to at least one target device. The program includes means for requesting the at least one boot file from a loading device in communication with the target device, means for executing, at the target device, a boot delay response so that the target device does not time out, and means for receiving, at the target device, the at least one boot file after the boot delay response is received.

The program may also include means for evaluating whether a boot delay response should be used, based on a state of network congestion. The program may also include means for executing the boot delay response repeatedly. The program may also include means for delaying at least one request for the boot file from the target device as the boot delay response. The program may also include means for delaying at least one response from the loading device as the boot delay response, the response comprising the at least one boot file. The program may also include means for altering boot parameters on the target device and/or on the loading device based on the boot delay response. The program may also include means for rebooting the target device after a timeout value has expired as the boot delay response.

Another aspect of the present invention provides a data processing system. The data processing system includes means for requesting at least one boot file from a loading device in communication with the target device, means for executing, at the target device, a boot delay response so that the target device does not time out, and means for receiving, at the target device, the boot file after the boot delay response is received.

The system may also include means for evaluating whether a boot delay response should be used, based on a state of network congestion. The system may also include means for executing the boot delay response repeatedly. The system may also include means for delaying at least one request for the boot file from the target device as the boot delay response. The system may also include means for delaying at least one response from the loading device as the boot delay response, the response comprising the at least one boot file. The system may also include means for altering boot parameters on the target device and/or on the loading device based on the boot delay response. The system may also include means for rebooting the target device after a timeout value has expired as the boot delay response.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

DETAILED DESCRIPTION OF THE PRESENTLY PREFERRED EMBODIMENTS

Figure 1:
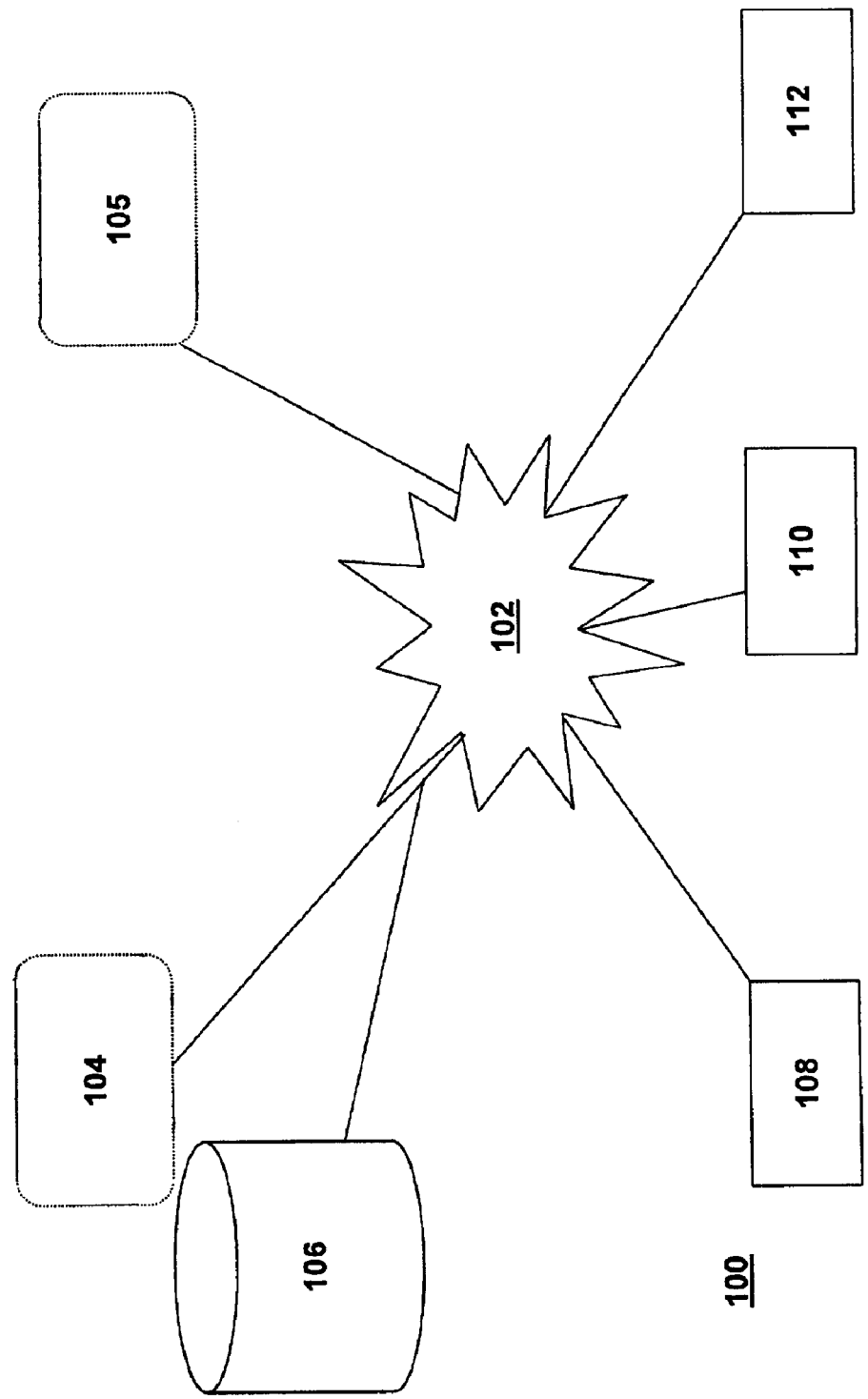
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices, such as computers, connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105 which may be identical to or different from server 104. Server 105 may also provide data, such as boot files, operating system images and applications to network 102 and/or to other components in communication with network 102 as described below. System 100 may also include additional servers (not shown).

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or processed by network 102 and/or to other components in communication with network 102 as described below.

In addition, target devices 108, 110 and 112 are also in communication with network 102. These target devices may be, for example, personal computers or network computers. Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

One embodiment of the present invention provides a network environment, which may include a DHCP/PXE proxy server. For example, server 104 may be a DHCP/PXE proxy server. Alternatively, server 105 may be a DHCP/PXE proxy server. System 100 may also include one or more boot servers. For example, server 104 or server 105 may serve as a boot server. These boot servers may be collated on servers 104, 105 with the DHCP/PXE proxy servers. In one embodiment of the invention, one or more target devices, such as devices 108, 110, 112, may include pre-boot extensions that allow the devices to download OS information from a boot server.

Another embodiment of the present invention provides a network environment which may include one or more loading devices equipped with a remote loading feature and/or programs, such as, for example, a RPL function. For example, one or more of servers 104, 105 may serve as a loading device. Alternatively, one or more of target devices 108, 110, 112 may be equipped with a remote loading feature and/or programs and may serve as loading devices to other target devices. For example, a target device 108, 110, 112 equipped with a bootstrap program and a loader program may send the bootstrap program to one or more other target devices that broadcast a load request.

In one embodiment of the invention, one or more target devices, such as devices 108, 110, 112 may include features and/or programs that enable the devices to download OS information from a loading device. For example, the target device may include an RPLBOOT.COM program, which marks the fixed disk in the target device as non-bootable so that the RPL feature can take control when the target device is started. The target device may also include a program that enables it to broadcast a load request.

Figure 2:
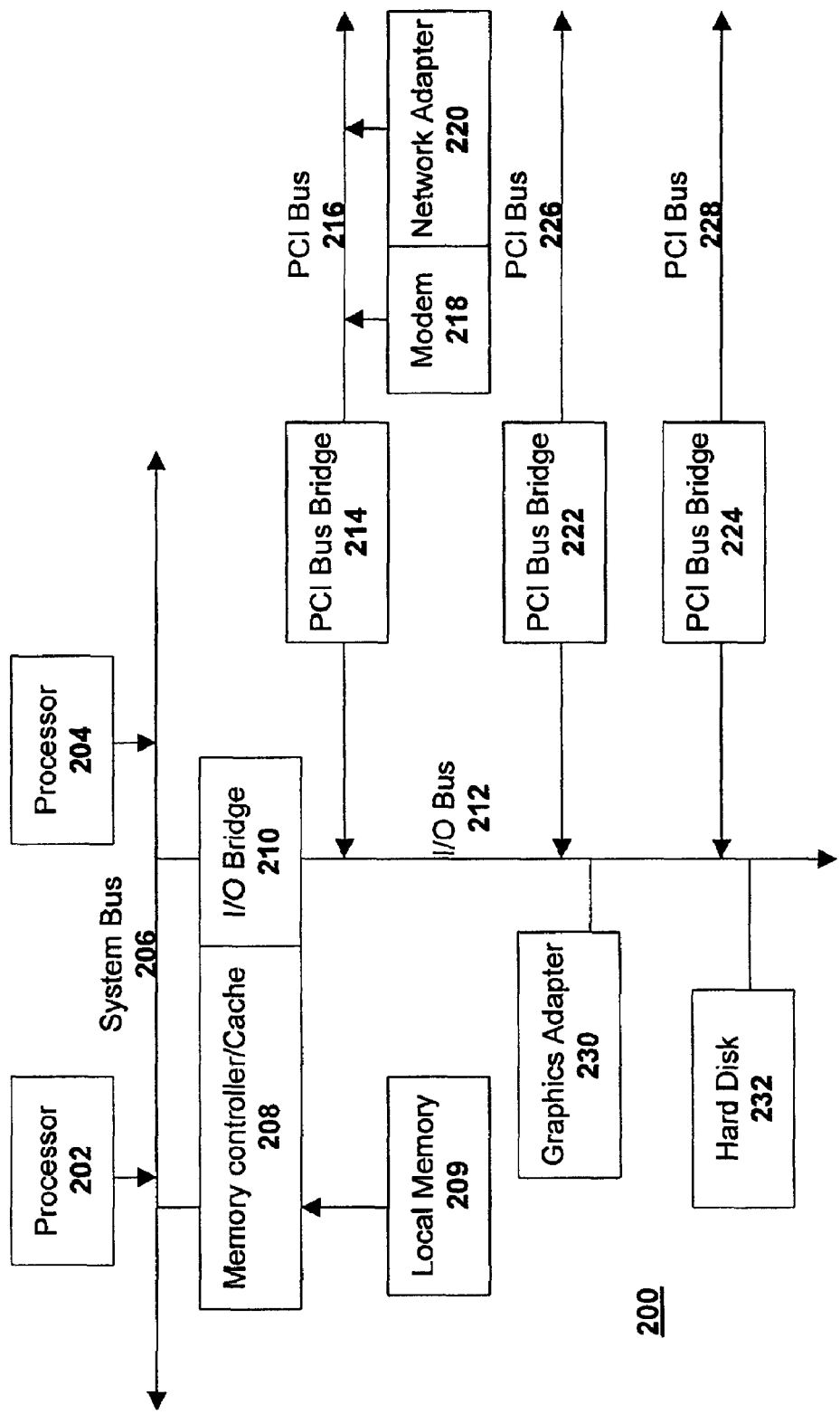
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104, 105 shown in FIG. 1.

Data processing system 200 may be a symmetric multiprocessors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG.1.

Additional PCI bus bridges 222 and 224 may provide interfaces for additional PCI buses 226 and 228. Additional modems or network adapters may be supported from PCI buses 226 and 228. For example, in one embodiment of the invention, PCI buses 226, 228 may support a network adapter with a remote loading feature, such as the RPL feature, installed. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

Figure 3:
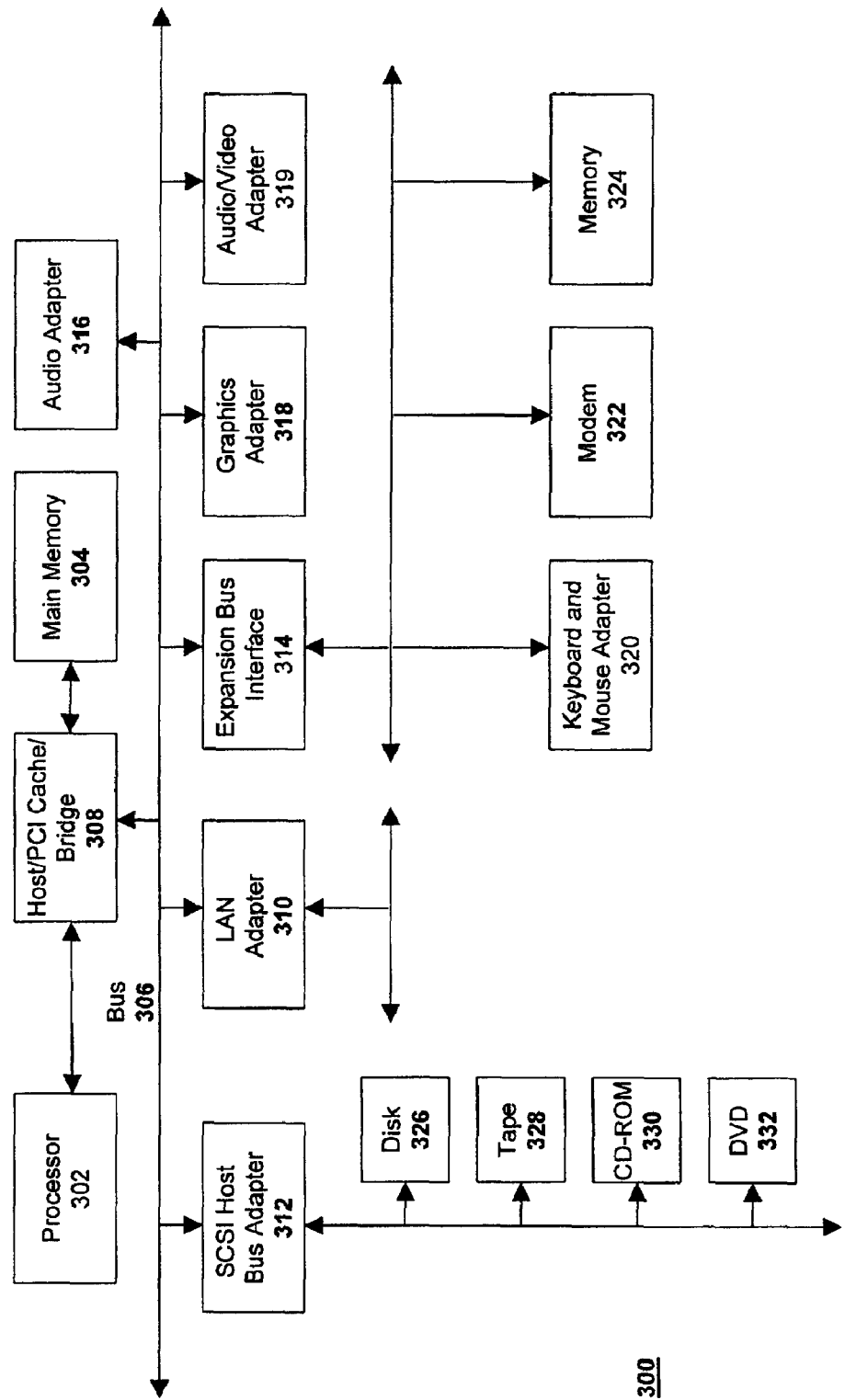
FIG. 3 is a block diagram of another embodiment of a data processing system in accordance with the present invention.

FIG. 3 is a block diagram of a data processing system in accordance with the present invention at 300. Data processing system 300 may be, for example, one or more of the target devices 108, 110, 112 depicted in FIG. 1 and described above. In one embodiment of the invention, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations support three or four PCI expansion slots or add-in connectors.

In one embodiment of the invention, an operating system (OS) may run on processor 302. This OS may be used to coordinate and provide control of various components within data processing system 300. The OS may be a commercially available operating system, such as, for example, Linux™, OS/2 Warp 4, or Windows 2000™. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide non-volatile memory for storing operating system files and/or user-generated data. Another embodiment of data processing system 300 may include network adapters suited to transmit or receive functions of a remote loading program and/or feature such as the RPL feature.

Figure 4:
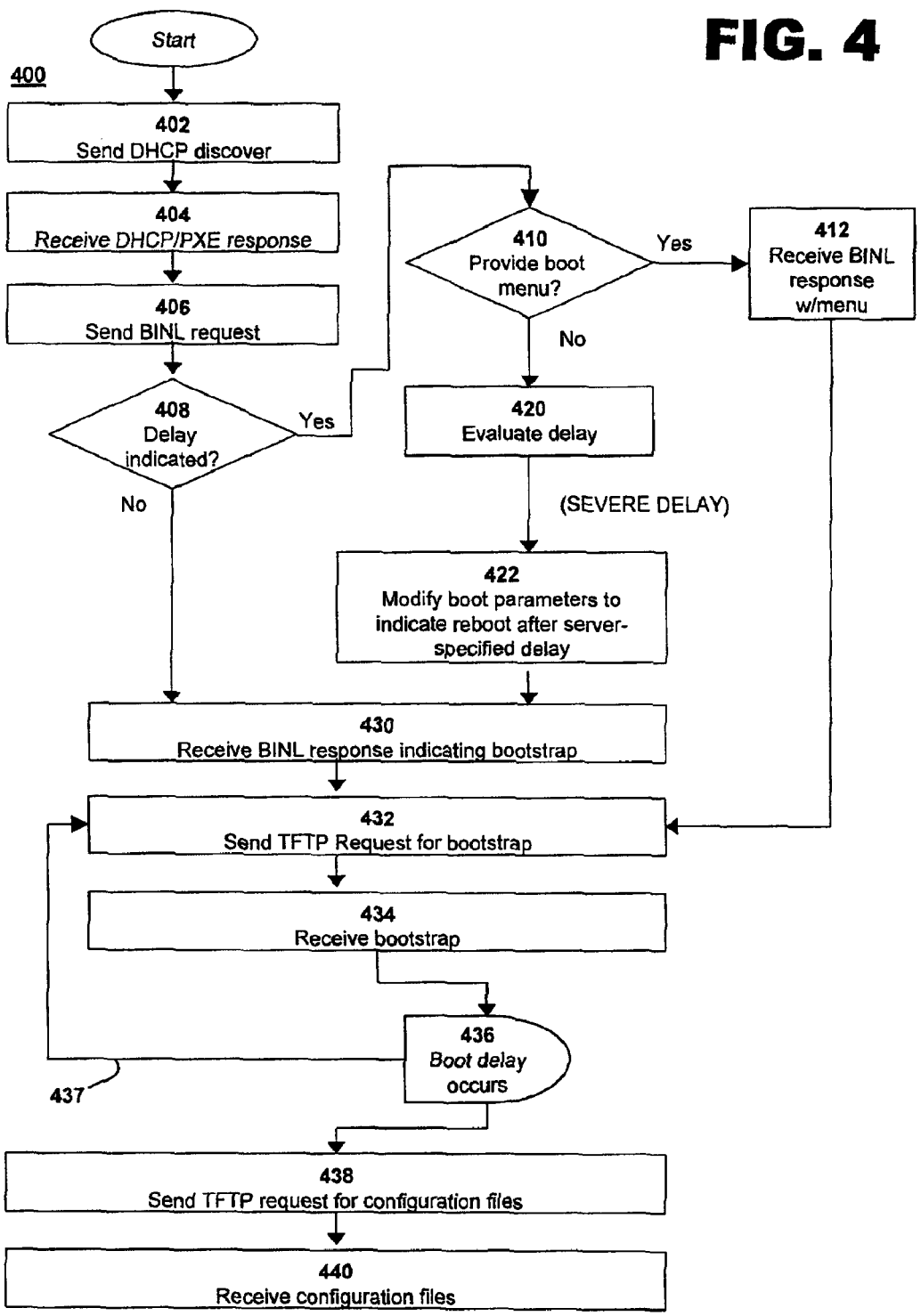
FIG. 4 is a flow diagram of one embodiment of a method of booting a target device in a network environment in accordance with the present invention.

FIG. 4 shows one embodiment of a method for booting a target device in accordance with the present invention at 400. The target device may be, for example, one or more devices 108, 110, 112 depicted in FIG. 1 and described above. In the embodiment of FIG. 4, the method is described from the perspective of the target device; equivalent steps from the perspective of a server or other loading device are also contemplated by the present invention.

At block 402, the target device may send a DHCP broadcast or DHCP discover. For example, the target device may be connected to a network and send the DHCP broadcast to the network and servers, such as BINL servers, in communication with the network. The DHCP broadcast or DHCP discover may be a request for DHCP/PXE proxy offers.

At block 404, the target device may receive one or more DHCP/PXE responses. For example, the response may be one or more DHCP/PXE proxy offers that indicate which other components in communication with the target device are able to process a BINL request.

At block 406, the target device may send a BINL request to a PXE proxy server. In one embodiment of the invention, this PXE proxy server is one of the proxy offers received at block 404.

At block 408, whether or not a network delay exists may be indicated to the target device. This indication may take the form of, for example a BINL reply from the PXE proxy server. In one embodiment of the invention, this reply indicates the IP address of a BINL server. A delay may be indicated to the target device by the length of time that it takes for the device to receive a response at block 404 from the request sent at block 402. Alternatively, a delay may be indicated to the target device by the length of time that it takes for the device to receive the BINL reply following the BINL request at block 406. Alternatively, a delay may be indicated if the target device detects network congestion at any of the blocks described above. In one embodiment of the invention, the target device may have a predetermined time after which a delay is indicated, i.e. if a response is not received after the predetermined time, a delay is indicated. The target device may also detect the delay in any other suitable manner.

If a delay is indicated, as seen at block 410, it may be determined whether a boot menu should be provided to the target device. This may be determined, for example by the server or by the target device and may be based on parameters including, but not limited to, the type of target device, the operating system requested by the device and network defaults set by an administrator. In one embodiment of the invention, a boot menu is sent to the target device, for example with the BINL response. The boot menu may be, for example, a menu offering choices to the user of the target devices, such as, for example, a choice of a standard bootstrap or a reboot bootstrap. Once the user selects the bootstrap, the method may proceed to block 432 where a TFTP request for the user-selected bootstrap is sent.

Alternatively, a boot menu is not sent to the target device. Whether or not a boot menu is received by the target device, as seen at block 420, the delay indicated at block 408 may be further evaluated in order to determine further action based on the delay. For example, in the embodiment shown in FIG. 4, the delay is evaluated at block 420 to be a SEVERE DELAY. This delay may be evaluated based on parameters including, but not limited to, total network congestion, congestion between the target device and a server, whether the delay is due to the target device or the server, and or/whether the server or the target device should control the boot delay response.

As seen at block 422, the boot parameters of the target device may be modified to indicate a boot delay response. In the embodiment of the invention shown at FIG. 4, the boot delay response may be a modification to the boot parameters that indicates that the target device should reboot after a server-specified time delay. For example, the configuration files of the target device may be modified. Alternatively, bootstrap configuration data received by the target device as described below may be modified.

As seen at block 430, the target device may then receive a BINL response. This BINL response may indicate, for example, a bootstrap to the target device. The BINL response may also indicate, for example, one or more BINL servers able to provide a bootstrap to the target device. The bootstrap may be, for example, a bootstrap with modified configuration data indicating a timeout value or server-specified delay as described above.

As seen at block 432, the target device may send a TFTP request, for example, to the BINL server indicated at block 430. In one embodiment of the invention, the request is for an initial NPB file. The request may also be a request for a bootstrap, for example, a bootstrap associated with a particular OS. The request may also be a request for a bootstrap chosen from a boot menu such as, for example, the boot menu described at block 412.

As seen at block 434, the target device may then receive a reply from the BINL server. For example, the server may provide a bootstrap to the target device. Alternatively, an OS and its associated bootstrap may be downloaded to the target device. In one embodiment of the invention, the NBP file is a chained bootstrap. This chained bootstrap may be specified once as the default bootstrap. This chained bootstrap may be the first bootstrap loaded on the target device. This chained bootstrap "chains" itself, e.g., interposes itself in front of, the actual OS/bootstrap to be used on the target machine. In one embodiment of the invention, a reference to this chained bootstrap is the only entry in the BINL server. Alternatively, a reference to this chained bootstrap may be the default reply of the BINL server. Thus, the BINL configuration may not change regardless of the OS/bootstrap eventually used on a given target device. The BINL configuration also may not change when a new OS is added into the system.

At block 436, the boot delay response in the boot process of the target device may occur. This boot delay response may be any suitable response that indicates to the target device that there will be some delay before the target device is able to boot. This boot delay response may also be any suitable response that prevents the target device from timing out before the device is able to boot.

The boot delay response may be, for example, the server-specified delay indicated at block 422 by modifications to the boot parameters. The parameters for this boot delay response (e.g., how long the time delay should last, whether the target machine should reboot after the time delay, etc.) may be indicated by changes made to the configuration files of the target device, for example, at block 422 above. Alternatively, the parameters for this time delay may be indicated by changes to the bootstrap that is received at block 434. For example, in the embodiment shown in FIG. 4, the boot delay response is that the target device will reboot after a time specified by the server. This response may be evoked by an alteration of the boot block. This alteration may take the form of, for example, a timeout value configured onto the boot block. The timeout value may indicate any suitable period of time after which the target device may time out. The timeout value may be configured by the administrator of the network or by any suitable component of the network. The timeout value may be based on any suitable parameters, such as, for example, number of target devices queued to boot at the same time.

As seen by the loop indicated at 437, in one embodiment of the invention, once the timeout value of the boot delay response expires, the target device may be rebooted automatically and may then re-send a request for a bootstrap to the server. The method may be repeated (i.e., the target device may timeout based on the modification at 422, reboot and re-send its request to be booted) any number of times until the target device is able to be booted. Alternatively, the target device may reboot in response to a user command such as a command entered by a user of the target device. For example, the user may receive instructions such as "Delay due to network congestion—Press enter to override timeout and boot immediately" and end the timeout delay by pressing enter.

Alternatively, as seen in FIG. 4, after the timeout value expires, the target device may reboot and continue to block 438 where it sends a TFTP request for configuration files.

At block 440, the target device may then receive the configuration files. These files may be, for example, additional files necessary to boot a minimal OS (e.g., an operating system kernel). The files may also be the remainder of the core operating system. These files may include, for example, files to load target device drivers and system libraries of the target device. Alternatively, the target device may receive an installation program. These files may be loaded onto the target device. These files may then be executed on the target device.

Figure 5:
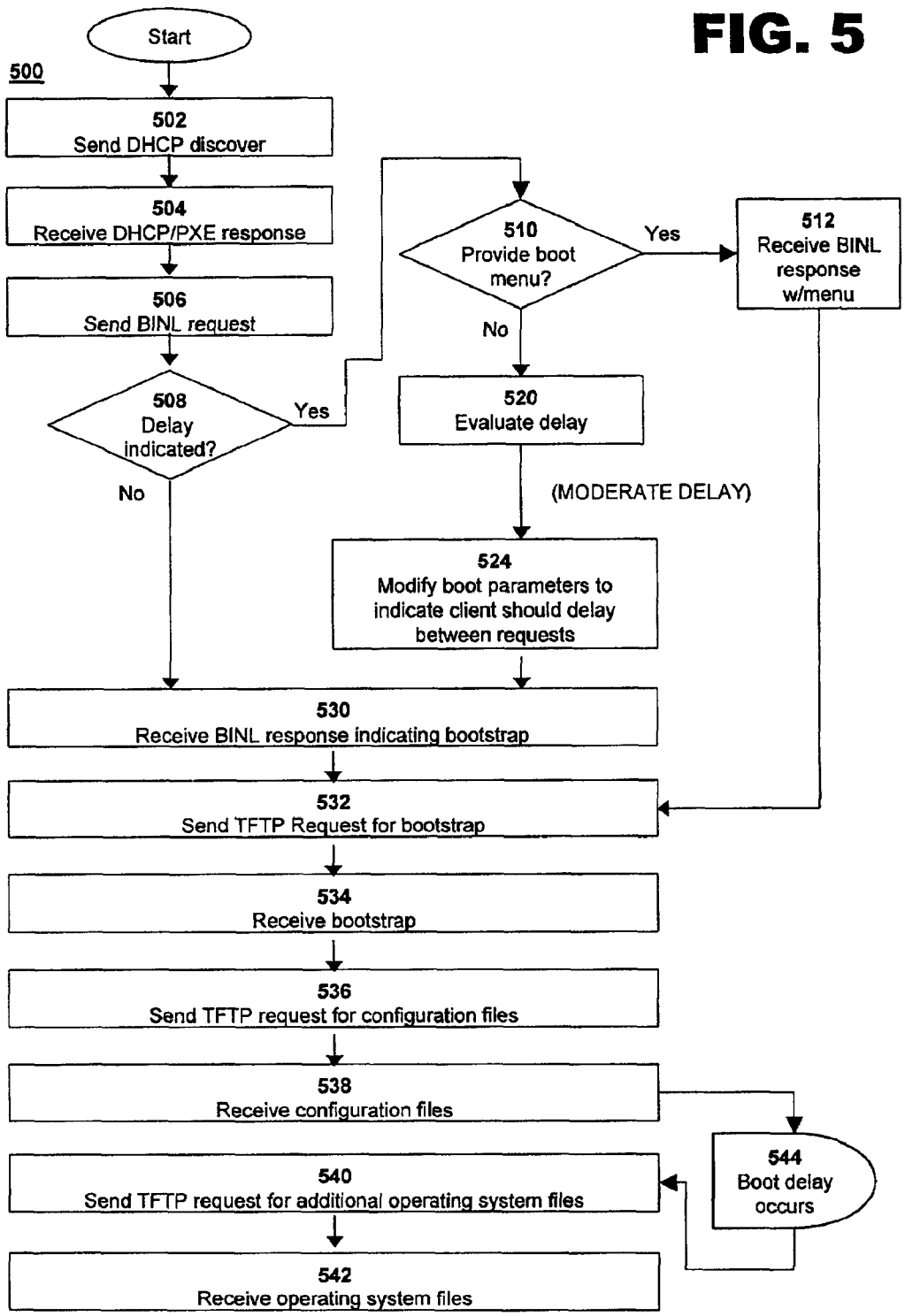
FIG. 5 is a flow diagram of another embodiment of a method of booting a target device in a network environment in accordance with the present invention.

FIG. 5 shows another embodiment of a method for booting a target device in accordance with the present invention at 500. The target device may be, for example, one or more devices 108, 110, 112 depicted in FIG. 1 and described above. In the embodiment of FIG. 5, the method is described from the perspective of the target device; equivalent steps from the perspective of a server or other loading device are also contemplated by the present invention.

At block 502, the target device may send a DHCP broadcast or DHCP discover. For example, the target device may be connected to a network and send the DHCP broadcast to the network and servers, such as BINL servers, in communication with the network. The DHCP broadcast or DHCP discover may be a request for DHCP/PXE proxy offers.

At block 504, the target device may receive one or more DHCP/PXE responses. For example, the response may be one or more DHCP/PXE proxy offers that indicate which other components in communication with the target device are able to process a BINL request.

At block 506, the target device may send a BINL request to a PXE proxy server. In one embodiment of the invention, this PXE proxy server is one of the proxy offers received at block 504.

At block 508, whether or not a network delay exists may be indicated to the target device. This indication may take the form of, for example a BINL reply from the PXE proxy server. In one embodiment of the invention, this reply indicates the IP address of a BINL server. A delay may be indicated to the target device by the length of time that it takes for the device to receive a response at block 504 from the request sent at block 502. Alternatively, a delay may be indicated to the target device by the length of time that it takes for the device to receive the BINL reply following the BINL request at block 506. Alternatively, a delay may be indicated if the target device detects network congestion at any of the blocks described above. In one embodiment of the invention, the target device may have a predetermined time after which a delay is indicated, i.e. if a response is not received after the predetermined time, a delay is indicated. The target device may also detect the delay in any other suitable manner.

If a delay is indicated, as seen at block 510, it may be determined whether a boot menu should be provided to the target device. This may be determined, for example by the server or by the target device and may be based on parameters including, but not limited to, the type of target device, the operating system requested by the device and network defaults set by an administrator. In one embodiment of the invention, a boot menu is sent to the target device, for example with the BINL response. The boot menu may be, for example, a menu offering choices to the user of the target devices, such as, for example, a choice of a standard bootstrap or a reboot bootstrap. Once the user selects the bootstrap, the method may proceed to block 532 where a TFTP request for the user-selected bootstrap is sent.

Alternatively, a boot menu is not sent to the target device. Whether or not a boot menu is received by the target device, as seen at block 520, the delay indicated at block 508 may be further evaluated in order to determine further action based on the delay. For example, in the embodiment shown in FIG. 5, the delay is evaluated at block 520 to be a MODERATE DELAY. This delay may be evaluated based on parameters including, but not limited to, total network congestion, congestion between the target device and a server, whether the delay is due to the target device or the server, and or/whether the server or the target device should control the boot delay response.

As seen at block 524, the boot parameters of the target device may be modified to indicate a boot delay response. In the embodiment of the invention shown at FIG. 5, the boot delay response may be a modification to the boot parameters that indicates that the target device should delay between its requests to the server. For example, the configuration files of the target device may be modified. Alternatively, bootstrap configuration data received by the target device as described below may be modified.

As seen at block 530, the target device may then receive a BINL response. This BINL response may indicate, for example, a bootstrap to the target device. The BINL response may also indicate, for example, one or more BINL servers able to provide a bootstrap to the target device. The bootstrap may be, for example, a bootstrap with modified configuration data indicating a value such as length of delay between requests to the server.

As seen at block 532, the target device may send a TFTP request, for example, to the BINL server indicated at block 530. In one embodiment of the invention, the request is for an initial NPB file. The request may also be a request for a bootstrap, for example, a bootstrap associated with a particular OS. The request may also be a request for a bootstrap chosen from a boot menu such as, for example, the boot menu described at block 512.

As seen at block 534, the target device may then receive a reply from the BINL server. For example, the server may provide a bootstrap to the target device. Alternatively, an OS and its associated bootstrap may be downloaded to the target device. In one embodiment of the invention, the NBP file is a chained bootstrap. This chained bootstrap may be specified once as the default bootstrap. This chained bootstrap may be the first bootstrap loaded on the target device. This chained bootstrap "chains" itself, e.g., interposes itself in front of, the actual OS/bootstrap to be used on the target machine. In one embodiment of the invention, a reference to this chained bootstrap is the only entry in the BINL server. Alternatively, a reference to this chained bootstrap may be the default reply of the BINL server. Thus, the BINL configuration may not change regardless of the OS/bootstrap eventually used on a given target device. The BINL configuration also may not change when a new OS is added into the system.

At block 536, the target device may send an initial TFTP request for configuration files.

At block 538, the target device may then receive the configuration files. These files may be, for example, additional files necessary to boot a minimal OS (e.g., an operating system kernel). The files may also be the remainder of the core operating system. These files may include, for example, files to load target device drivers and system libraries of the target device. Alternatively, the target device may receive an installation program. In one embodiment of the invention, the configuration files may be configuration files modified at block 524 which indicate that the target device should delay between its requests to the server. For example, the configuration files may be modified with a predetermined length of time for the delay (e.g., delay one minute between every request.) This length of time may be determined based on any suitable factors, including but not limited to, number of target devices attempting to boot from a particular server and type of operating system to be executed on the target device. For example, if a large number of target devices are attempting to boot from the same server, each target device may be configured to delay for a long time between its requests. Meanwhile, if a target device is requesting an operating system with a large number of files, the target device may be configured to delay for a shorter time between requests.

At block 544, the boot delay response indicated above may occur. This boot delay response may be any suitable response that indicates to the target device that there will be some delay before the target device is able to boot. This boot delay response may also be any suitable response that prevents the target device from timing out before the device is able to boot.

The boot delay response may be, for example, a delay between requests for additional operating files (one such delay is indicated, for example by modifications to the boot parameters at block 524). The parameters for this boot delay response (e.g., how long the delay between requests should last, whether the target machine should reboot after the time delay, etc.) may be indicated by changes made to the configuration files of the target device, for example, at block 524 above. Alternatively, the parameters for this time delay may be indicated by changes to the bootstrap that is received at block 534. Alternatively, the parameters for the time delay may be based on a user command such as a command entered by a user of the target device. For example, the user may receive instructions such as "Delay due to network congestion—Press enter to request next file from the server". In addition to these factors, the delay may also be based on for example, the amount of time between the initial request at block 536 and response at block 538. For example, the target device may measure the time between its request and a corresponding response. If the time is greater than a predetermined threshold, the target device may delay in requesting additional operating system files (e.g., may delay in proceeding to step 540). For example, the target device may increase the time between its TFTP requests to the server for these files.

Once the appropriate time delay is over, the target device may proceed to block 540 and send its next request for additional operating system files which it duly receives at block 542.

As seen by the loop including block 544, the method may be repeated (i.e., the target device may delay, send a request, receive the requested files and delay again) any number of times until the target device is able to be booted.

Figure 6:
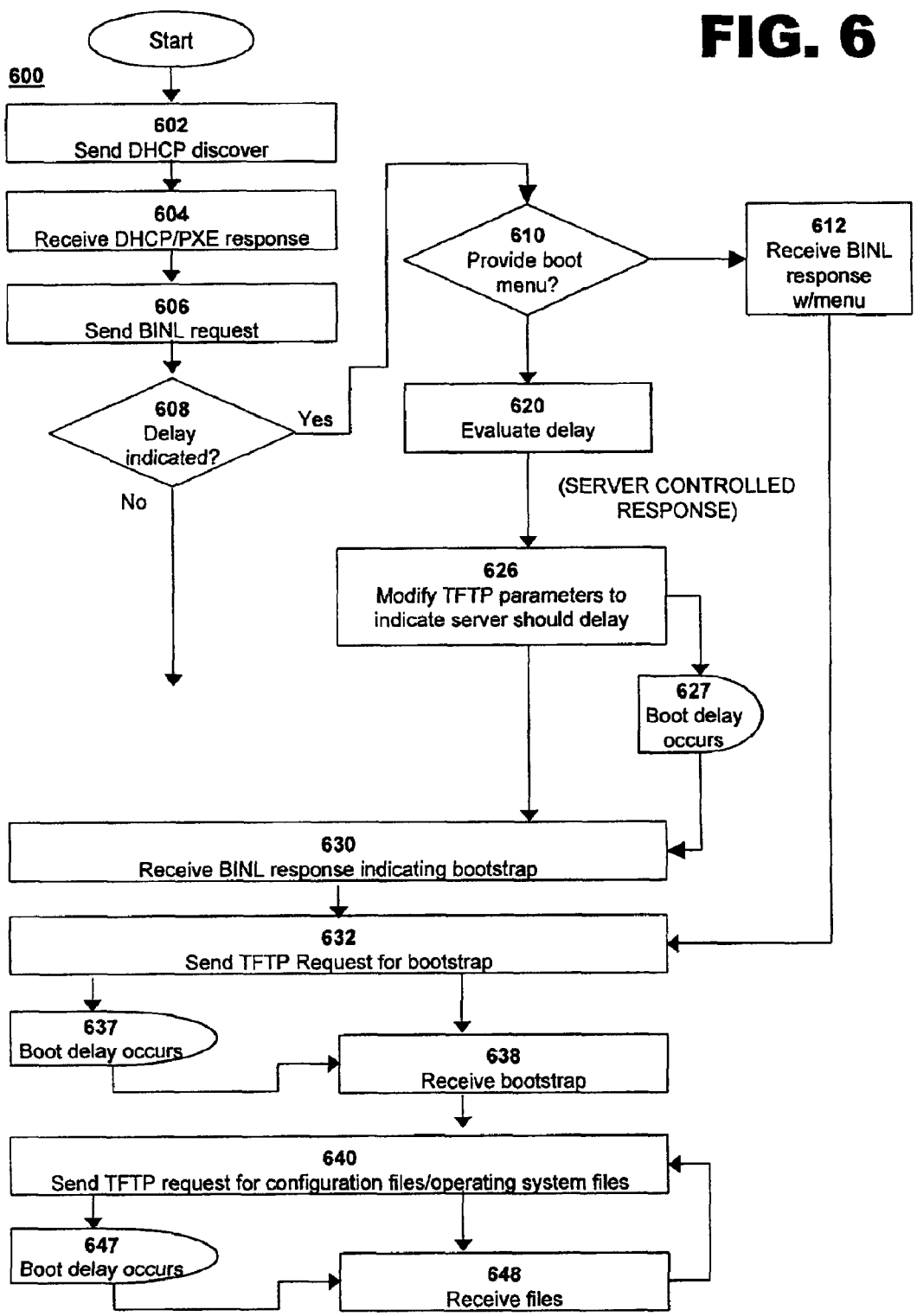
FIG. 6 is a flow diagram of a third embodiment of a method of booting a target device in a network environment in accordance with the present invention.

FIG. 6 shows a third embodiment of a method for booting a target device in accordance with the present invention at 600. The target device may be, for example, one or more devices 108, 110, 112 depicted in FIG. 1 and described above. In the embodiment of FIG. 6, the method is described from the perspective of the target device; equivalent steps from the perspective of a server or other loading device are also contemplated by the present invention.

At block 602, the target device may send a DHCP broadcast or DHCP discover. For example, the target device may be connected to a network and send the DHCP broadcast to the network and servers, such as BINL servers, in communication with the network. The DHCP broadcast or DHCP discover may be a request for DHCP/PXE proxy offers.

At block 604, the target device may receive one or more DHCP/PXE responses. For example, the response may be one or more DHCP/PXE proxy offers that indicate which other components in communication with the target device are able to process a BINL request.

At block 606, the target device may send a BINL request to a PXE proxy server. In one embodiment of the invention, this PXE proxy server is one of the proxy offers received at block 604.

At block 608, whether or not a network delay exists may be indicated to the target device. This indication may take the form of, for example, a BINL reply from the PXE proxy server. In one embodiment of the invention, this reply indicates the IP address of a BINL server. A delay may be indicated to the target device by the length of time that it takes for the device to receive a response at block 604 from the request sent at block 602. Alternatively, a delay may be indicated to the target device by the length of time that it takes for the device to receive the BINL reply following the BINL request at block 606. Alternatively, a delay may be indicated if the target device detects network congestion at any of the blocks described above. In one embodiment of the invention, the target device may have a predetermined time after which a delay is indicated, i.e. if a response is not received after the predetermined time, a delay is indicated. The target device may also detect the delay in any other suitable manner.

If a delay is indicated, as seen at block 610, it may be determined whether a boot menu should be provided to the target device. This may be determined, for example by the server or by the target device and may be based on parameters including, but not limited to, the type of target device, the operating system requested by the device and network defaults set by an administrator. In one embodiment of the invention, a boot menu is sent to the target device, for example with the BINL response. The boot menu may be, for example, a menu offering choices to the user of the target devices, such as, for example, a choice of a standard bootstrap or a reboot bootstrap. Once the user selects the bootstrap, the method may proceed to block 632 where a TFTP request for the user-selected bootstrap is sent.

Alternatively, a boot menu is not sent to the target device. Whether or not a boot menu is received by the target device, as seen at block 620, the delay indicated at block 608 may be further evaluated in order to determine further action based on the delay. For example, in the embodiment shown in FIG. 6, the delay is evaluated at block 620 to be a SERVER CONTROLLED RESPONSE DELAY, i.e., a delay for which the server should control the boot response. This delay may be evaluated based on parameters including, but not limited to, total network congestion, congestion between the target device and a server, whether the delay is due to the target device or the server, and or/whether the server or the target device should control the boot delay response.

As seen at block 626, the boot parameters, such as the TFTP parameters, of the server may be modified to indicate that the server should control a boot delay response. In the embodiment of the invention shown at FIG. 6, the boot delay response may be a modification to the TFTP parameters that indicates that the server should delay between its responses to the target device. This delay in server responses may, in turn, cause the requests from the target device to slow down. The delay in server responses to the target device may occur at one or more points in the process. For example, in the embodiment of FIG. 6, the server may delay its responses at one or more of three times 627, 637, 647.

The TFTP parameters may be modified with a predetermined length of time for the delay (e.g., delay one minute between every request.) This length of time may be determined based on any suitable factors, including but not limited to, number of target devices attempting to boot from a particular server and type of operating system to be executed on the target device. For example, if a large number of target devices are attempting to boot from the same server, the server may be configured to delay for a relatively long time between its responses. Meanwhile, if a target device is requesting an operating system with a large number of files, the server may be configured to delay its responses for only a short period of time.

In one embodiment of the invention, the parameters may be modified so that server checks a "congested" indicator prior to sending its responses. The congested indicator may indicate a state of network congestion. Alternatively, the congestion of the target device may be determined. For example, if the server detects that the target device does not have the reserved boot resources, the target device is flagged as congested. Methods and devices of determining whether a network or target device may be flagged as "congested" are described in co-pending U.S. patent application Ser. No. 09/844,339 entitled "METHOD AND SYSTEM FOR ORGANIZED BOOTING OF A TARGET DEVICE IN A NETWORK ENVIRONMENT" herein incorporated by reference in its entirety.

The server controlled boot response may be any suitable response that indicates to the target device that there will be some delay before the target device is able to boot. This boot delay response may also be any suitable response that prevents the target device from timing out before the device is able to boot. The server controlled boot response may also be a response that checks for a congested indicator. The parameters for this boot delay response (e.g., how long the delay between requests should last, whether the target machine should reboot after the time delay, etc.) may be indicated by changes made to the configuration files of the server, for example, at block 626 above. Alternatively, the parameters for the time delay may be based on a user command such as a command entered by a user of the target device. For example, the user may receive instructions such as "Delay due to network congestion—Press enter to override server delay and request next file from the server". In addition to these factors, the delay may also be based on for example, the amount of time between the first response of the server (for example, at block 630) and the next request received by the server from the target device (for example at block 632). For example, the server may measure the time between its response to a first request and a corresponding new request from the target device. If the time is greater than a predetermined threshold, the server may delay in responding with additional operating system files.

In one embodiment, of the invention, the server delays before sending a BINL response indicating a bootstrap as seen at block 627. Thus, from the target device's perspective, there is a delay before the method proceeds to block 630.

As seen at block 630, the target device may then receive a BINL response. This BINL response may indicate, for example, a bootstrap to the target device. The BINL response may also indicate, for example, one or more BINL servers able to provide a bootstrap to the target device. The bootstrap may be, for example, a bootstrap with modified configuration data indicating a value such as length of delay between requests to the server.

As seen at block 632, the target device may send a TFTP request, for example, to the BINL server indicated at block 630. In one embodiment of the invention, the request is for an initial NPB file. The request may also be a request for a bootstrap, for example, a bootstrap associated with a particular OS. The request may also be a request for a bootstrap chosen from a boot menu such as, for example, the boot menu described at block 612.

In one embodiment, of the invention, the server delays before sending a bootstrap as seen at block 637. Thus, from the target device's perspective, there is a delay before the method proceeds to block 638.

As seen at block 638, the target device may then receive a reply from the BINL server. For example, the server may provide a bootstrap to the target device. Alternatively, an OS and its associated bootstrap may be downloaded to the target device. In one embodiment of the invention, the NBP file is a chained bootstrap. This chained bootstrap may be specified once as the default bootstrap. This chained bootstrap may be the first bootstrap loaded on the target device. This chained bootstrap "chains" itself, e.g., interposes itself in front of, the actual OS/bootstrap to be used on the target machine. In one embodiment of the invention, a reference to this chained bootstrap is the only entry in the BINL server. Alternatively, a reference to this chained bootstrap may be the default reply of the BINL server. Thus, the BINL configuration may not change regardless of the OS/bootstrap eventually used on a given target device. The BINL configuration also may not change when a new OS is added into the system.

At block 640, the target device may send an initial TFTP request for configuration files.

In one embodiment, of the invention, the server delays before sending the configuration files, as seen at block 647. Thus, from the target device's perspective, there is a delay before the method proceeds to block 648.

At block 648, the target device may then receive the configuration files. These files may be, for example, additional files necessary to boot a minimal OS (e.g., an operating system kernel). The files may also be the remainder of the core operating system. These files may include, for example, files to load target device drivers and system libraries of the target device. Alternatively, the target device may receive an installation program.

As seen by the loop including block 647, the method may be repeated (i.e., the server may delay, send a response such as a configuration file, receive another request from the target device and delay again) any number of times until the target device is able to be booted.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal-bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

What is claimed is:

1. A method of booting at least one target device in communication with a network, comprising:

requesting at least one boot file from a loading device in communication with the target device;

executing, at the target device, a boot delay response so that the target device does not time out; and receiving, at the target device, the boot file after the boot delay response is received.

2. The method of claim 1 wherein the boot file is selected from the group consisting of:

a bootstrap program, a configuration file, a boot parameters file, and operating system file.

3. The method of claim 1 further comprising:

evaluating whether a boot delay response should be used based on a state of network congestion.

4. The method of claim 1 further comprising:

executing the boot delay response repeatedly.

5. The method of claim 1 wherein the loading device is a server in communication with the target device.

6. The method of claim 1 wherein the loading device is a client device with a loading program in communication with the target device.

7. The method of claim 1 wherein the at least one target device is a plurality of target devices.

8. The method of claim 1 further comprising:

delaying at least one request for the boot file from the target device as the boot delay response.

9. The method of claim 1 further comprising:

delaying at least one response from the loading device as the boot delay response, the response comprising the at least one boot file.

10. The method of claim 1 further comprising:

altering boot parameters on the target device based on the boot delay response.

11. The method of claim 1 further comprising:

altering boot parameters on the loading device based on the boot delay response.

12. The method of claim 1 further comprising;

rebooting the target device after a timeout value has expired as the boot delay response.

13. Computer program product in a computer usable medium for providing at least one boot file to at least one target device, comprising:

means for requesting the at least one boot file from a loading device in communication with the target device;

means for executing, at the target device, a boot delay response so that the target device does not time out; and means for receiving, at the target device, the at least one boot file after the boot delay response is received.

14. The program of claim 13 further comprising:

means for evaluating whether a boot delay response should be used, based on a state of network congestion.

15. The program of claim 13 further comprising:

means for executing the boot delay response repeatedly.

16. The program of claim 13 further comprising:

means for delaying at least one request for the boot file from the target device as the boot delay response.

17. The program of claim 13 further comprising:

means for delaying at least one response from the loading device as the boot delay response, the response comprising the at least one boot file.

18. The program of claim 13 further comprising:
means for altering boot parameters on the target device based on the boot delay response.
19. The program of claim 13 further comprising:
means for altering boot parameters on the loading device based on the boot delay response.
20. The program of claim 13 further comprising:
means for rebooting the target device after a timeout value has expired as the boot delay response.
21. A data processing system, comprising:
means for requesting at least one boot file from a loading device in communication with the target device;
means for executing at the target device, a boot delay response so that the target device does not time out; and
means for receiving, at the target device, the boot file after the boot delay response is received.
22. The system of claim 21 further comprising;
means for evaluating whether a boot delay response should be used based on a state of network congestion.
23. The system of claim 21 further comprising:
means for executing the boot delay response repeatedly.
24. The system of claim 21 further comprising;
means for delaying at least one request for the boot file from the target device as the boot delay response.
25. The system of claim 21 further comprising:
means for delaying at least one response from the loading device as the boot delay response, the response comprising at least one boot file.
26. The system of claim 21 further comprising:
means for altering boot parameters on the target device based on the boot delay response.
27. The system of claim 21 further comprising:
means for altering boot parameters on the loading device based on the boot delay response.
28. The system of claim 21 further comprising:
means for rebooting the target device after a timeout value has expired as the boot delay response.
29. A method of booting at least one target device in communication with a network, comprising:
requesting at least one boot file from a loading device in communication with the target device;
receiving one or more responses indicating which components are available to process a boot image negotiation layer;
sending a boot image negotiation layer request to an available component;
receiving an indication of a network delay;
executing, at the target device, a boot delay response so that the target device does not time out; and
receiving, at the target device, the boot file after the boot delay response is received.
30. The method of claim 29 wherein the length of the delay is based an total network congestion, congestion between the target device and the component, whether the delay is due to the target device or the server, whether the server or target should control the delay, and a combination of the above.

* * * * *

UNITED STATES PATENT AND TRADEMARK OFFICE
CERTIFICATE OF CORRECTION

PATENT NO. : 6,928,538 B2
DATED : August 9, 2005
INVENTOR(S) : Steven M. French et al.

It is certified that error appears in the above-identified patent and that said Letters Patent is hereby corrected as shown below:

Column 18,
Line 25, should read -- delay is based on total network congestion, congestion --.

Signed and Sealed this

Eighteenth Day of October, 2005

JON W. DUDAS
*Director of the United States Patent and Trademark Office*